(12) United States Patent
Devine

(10) Patent No.: US 6,325,566 B1
(45) Date of Patent: Dec. 4, 2001

(54) LOAD-SENSING MULTI-AXIS CONNECTOR

(75) Inventor: Edward A. Devine, Potomac, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/526,431

(22) Filed: Mar. 15, 2000

(51) Int. Cl.⁷ .................................................. F16D 1/00
(52) U.S. Cl. ............................ 403/220; 403/53; 403/63; 403/43; 403/122; 73/815
(58) Field of Search ........................... 73/812, 815, 849, 73/862.391; 403/220, 54, 53, 63, 43, 45, 122, 126

(56) References Cited

U.S. PATENT DOCUMENTS

| | | |
|---|---|---|
| 3,648,514 | 3/1972 | Vilain . |
| 4,037,675 * | 7/1977 | Storace et al. ................. 177/229 |
| 4,251,918 * | 2/1981 | Duggan ........................... 33/790 |
| 4,491,021 * | 1/1985 | Meline ............................. 73/767 |
| 4,717,288 | 1/1988 | Finn et al. . |
| 4,914,963 * | 4/1990 | Sabiron ........................ 73/862.59 |
| 4,981,552 | 1/1991 | Mikkor . |
| 5,063,788 | 11/1991 | Ch'Hayder et al. . |
| 5,129,265 | 7/1992 | Bartels et al. . |
| 5,490,427 | 2/1996 | Yee et al. . |
| 5,509,238 | 4/1996 | Scalfati . |
| 5,642,956 * | 7/1997 | Hale ............................... 403/122 |

OTHER PUBLICATIONS

Conference paper titled: Model Test Design and Preparation Mobile Offshore Base—Technology Exchange Conference dated Sep. 22, 1998 by Richard Lewis.

* cited by examiner

Primary Examiner—Lynne H. Browne
Assistant Examiner—Aaron Dunwoody
(74) Attorney, Agent, or Firm—Steven W. Crabb

(57) ABSTRACT

A load-sensing, multi-axis connector is disclosed which comprises a series of complimentary leaf springs, which are connected by load cells through spherical bearings. These leaf springs resist the axial displacement of their attached load cells, but are isolated from non-axial displacements and moments due to the spherical bearings. These leaf springs are attached to a first end connector and a second end connector, which are in turn attached to the two objects that are to be connected. Using the load-sensing, multi-axis connector, two objects can be connected, even where the two objects are undergoing high displacements, and the stresses caused by the relative displacement of the two objects can be monitored.

19 Claims, 5 Drawing Sheets

LOAD-SENSING MULTI-AXIS CONNECTOR

STATEMENT OF GOVERNMENT INTEREST

The invention described herein may be manufactured and used by or for the Government of the United States of America for governmental purposes without payment of any royalties thereon or therefore.

BACKGROUND OF THE INVENTION

1. Field Of The Invention

This invention relates to a connector having the capacity to sense loads caused by displacements in multiple axes. Specifically, this invention relates to a connector having the capacity to both connect objects undergoing large displacements, and to provide an accurate measure of the loads caused by these displacements.

2. Description Of The Related Art

In general, where two large objects are going to be flexibly connected, there is a need to understand the forces experienced at that connection point. This information is both useful in the design of those connections, as well as in monitoring the motions and displacements of the structure after installation. At the same time, there needs to be a way to actually join the objects, for that joint to be realistic in light of the conditions likely to be experienced by that joint, and for a method of measuring the loads experienced by the joint under high displacements. For testing purposes, such a connection needs model a flexible joint being subjected to the type of force normally experienced by objects undergoing high displacements. For instance, examples of connectors undergoing high displacements include connections between oil rigs and the ocean floor or between coupled barges and ships where the oil rig, barge, or ship is being subjected to a high sea state. In addition, such a connector could be useful in modeling flexible buildings foundations being subjected to a severe earthquake.

Outside of testing, there is often a need to continuously monitor the behavior of a flexible joint undergoing high displacements to assess the health of that joint, and to use this assessment to determine whether to take corrective action to maintain the health of the joined structures. For instance, such a flexible connector would be useful in providing early warning to an oil rig should the high sea state cause unsafe stress at the connection between the ocean floor and the oil rig structure, allowing for the oil rig operators to react properly. However, the prior art is devoid of a suitable invention that both connects objects undergoing large displacements and allows for measurement of the stresses these displacements cause that connector.

First, it is known in the art to connect two objects that are undergoing large dynamic loading. For example, U.S. Pat. No. 4,717,288 teaches the use of a building joint being that is resistant to severe earthquake displacements. This joint consists of interconnected cantilever beams that provide flexibility in multiple axes. However, the joint taught by U.S. Pat. No. 4,717,288 does not teach an interconnection of cantilever beams where specific sets of beams isolate the displacements along a specific axes, which makes the sensing of loads caused by this displacements impracticable. Similarly, in U.S. Pat. No. 5,509,238, the joint utilized a series of "C" shaped springs that allows the attached structures to move in multiple axes relative to one another. However, this arrangement also fails to isolate the displacements as is needed to sense the loading that the joint is experiencing.

In addition, it is known to sense the loading of connections between objects undergoing these large dynamic motions and displacements. However, prior solutions were restricted to either measuring small displacements, or to measuring inflexible connectors. For instance, U.S. Pat. No. 3,648,514 discloses a sensing joint that relies upon a series of hollow flexural elements, with each flexural element containing a stiff internal rod. This combination attaches two structures at discrete attachment points. By combining a flexural element and a rod, this combination gives a single mechanism for measuring loads caused by displacements in three orthogonal directions. However, due to the stiffness of the internal rod, this solution is not suited for situations where the connected members are undergoing large displacements.

Similarly, in Richard Lewis, *Mobile Test Design and Preparation*, Presentation at the ONR Mobile Offshore Base Technology Exchange Conference (Arlington, Va.)(Sep. 22, 1998), a connector is proposed that is both capable of measuring the loads experienced by connectors linking modules in the proposed Mobile Offshore Base, and is capable of acting as a connector between these modules. The proposed connector relies upon a series of load cells connecting these modules. These load cells are arranged in an orthogonal pattern, which allows each load cell to substantially resist the displacement along either a vertical, lateral, or longitudinal direction, depending on the orientation of that load cell. To isolate the axial loads taken by the load cells, this invention also uses ball joints to prevent the load cell from resisting non-axial displacements and moments. However, this load cell arrangement is fairly inflexible and would not be suitable for modeling connected members undergoing large displacements. Thus previous joints and connectors used to measure large dynamic displacements and motions do not allow for accurate modeling of flexibly connected members undergoing large-scale displacements.

Lastly, there are other solutions to multi-axis force connector measurement available. However, some, such as U.S. Pat. Nos. 5,490,427 and 5,063,788, while capable of measuring loads experienced by a connection in multiple axes, are unsuitable to also be used as a connector between objects experiencing large displacements. Still other solutions exists such as that suggested by U.S. Pat. No. 5,129,265, which utilizes flexible mechanisms to allow for large displacements. However, this invention does not allow for loads experienced by more than two axes and is not be suitable for use as a connector between two large objects that is experiencing displacements in more than two axis. Additionally, U.S. Pat. No. 4,981,552 discloses a highly sensitive multi-axis measuring devices using leaf springs that allow for high displacement motions. However, these leaf springs are used as multi-axis measuring devices, and would not be suitable for adaptation as a multi-axis connector.

As such, there exists no suitable connector that both connects two objects undergoing large displacements and is capable of measuring the loads caused by these large displacements.

SUMMARY OF THE INVENTION

Accordingly, it is the object of this invention to provide a connector that allows for large displacements between flexibly connected objects.

It is a further object of this invention to provide a connector that can also measure the loads caused by these large displacements.

DESCRIPTION OF THE PREFERRED EMBODIMENTS

Figure 1:
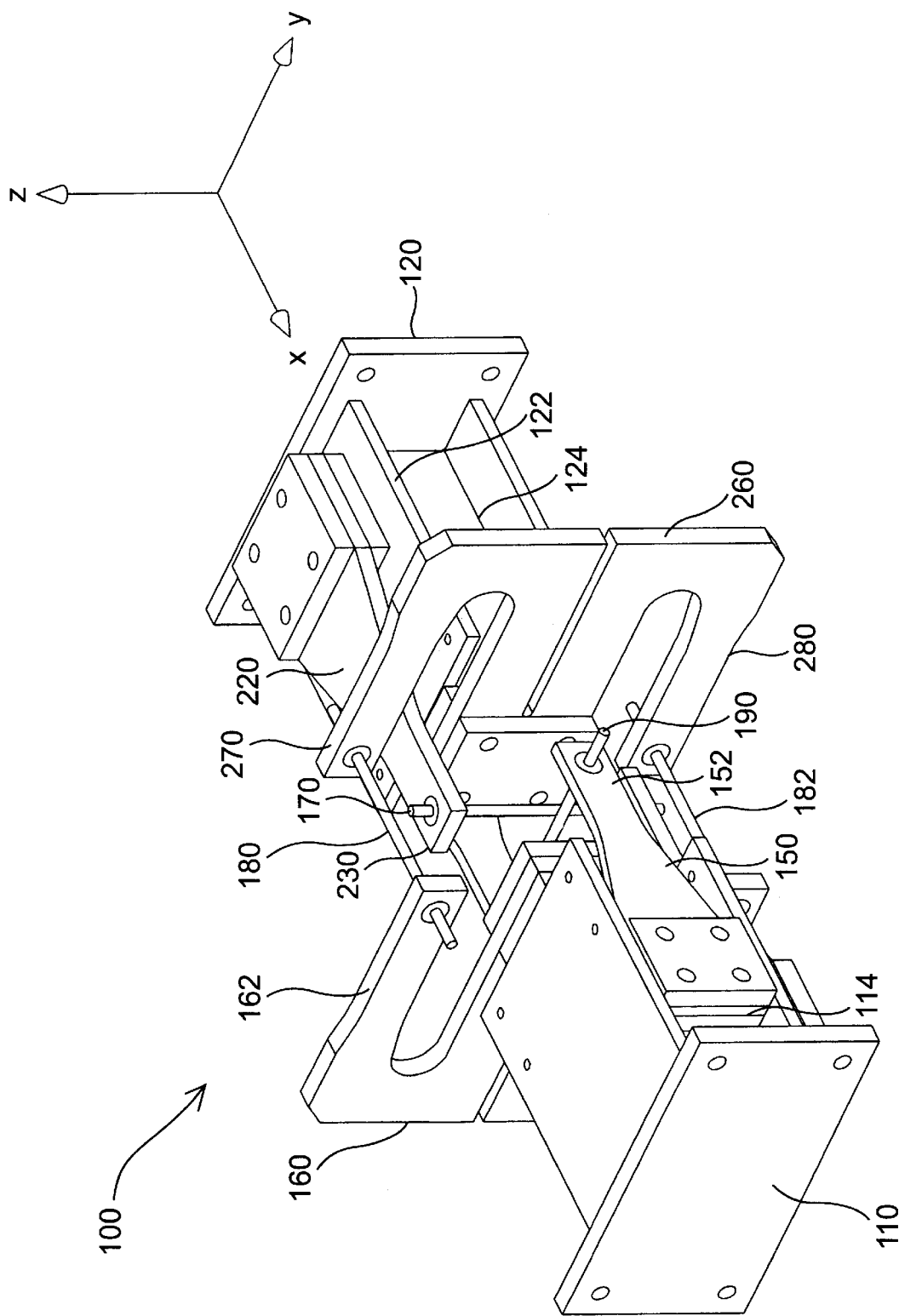
FIG. 1 is an orthogonal view of the load-sensing, multi-axis connector according to the present invention.
Figure 2:
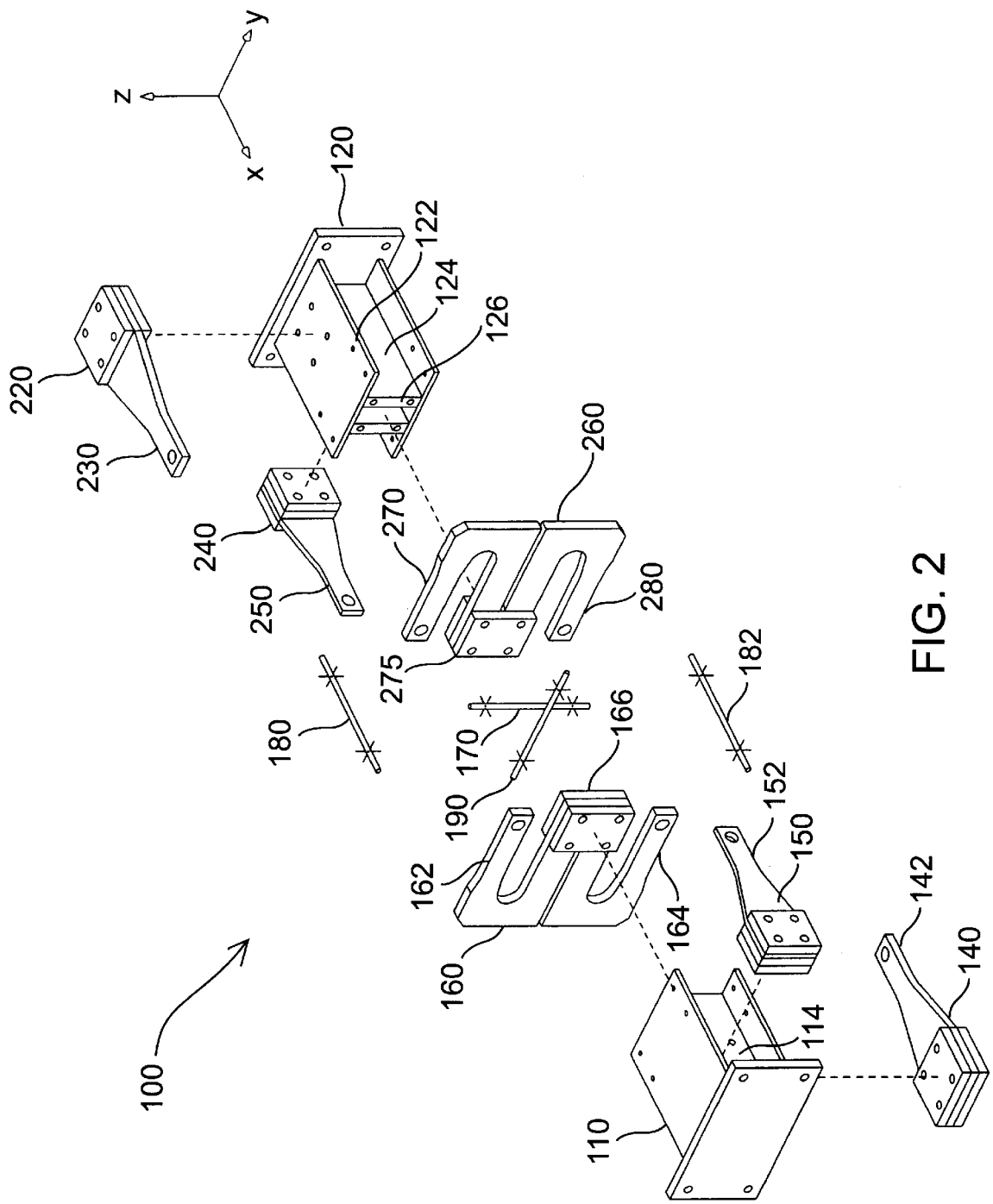
FIG. 2 is an exploded orthogonal view of the load-sensing, multi-axis connector according to the present invention.

As shown in FIGS. 1 and 2, in a preferred embodiment, the load-sensing, multi-axis connector 100 comprises four load cells connecting a pair of end units: a vertical load cell 170, a lateral load cell 190, an upper longitudinal load cell 180, and a lower longitudinal load cell 182. These four load cells connect opposable pairs of leaf springs which substantially resist displacement along a particular axis as defined in FIG. 1: a first vertical leaf spring 140 and a complimentary second vertical leaf spring 220 substantially resisting displacement along the z axis; a first lateral leaf spring 150 and a complimentary second lateral leaf spring 240 substantially resisting displacement along the y axis; and a first longitudinal leaf spring 160 and a complimentary second longitudinal leaf spring 260 resisting displacement along the X axis.

As shown in FIGS. 1 and 2, the vertical load cell 170 is connected near its ends to a first vertical leaf spring 140 and a second vertical leaf spring 220 by spherical bearings 200 (not shown). The lateral load cell 190 is connected near its ends to first lateral leaf spring 150 and second lateral leaf spring 240 by spherical bearings 200 (not shown). Next, the upper longitudinal load cell 180 and the lower longitudinal load cell 182 are connected near their ends to a first longitudinal leaf spring 160 and a second longitudinal leaf spring 260 by spherical bearings 200 (not shown). The first longitudinal leaf spring 160 has an upper prong 162 and a lower prong 164. The second longitudinal leaf spring 260 also has an upper prong 270 and a lower prong 280. The upper longitudinal load cell 180 connects the upper prongs 162 and 270, while the lower longitudinal load cell 182 connects the lower prongs 164 and 280.

As is more clearly shown in FIG. 2, the first vertical leaf spring 140 is mounted by fasteners 210 (not shown) to the bottom 112 (not shown) of first end unit 110, with prong 142 extending toward the second end unit 120. The second vertical leaf spring 220 is mounted by fasteners 210 (not shown) to the top 122 of second end unit 120, with prong 230 extending toward said first end unit 110.

Next, the first lateral leaf spring 150 is mounted by fasteners 210 (not shown) to a first side 114 of the first end unit 110, with prong 152 extending toward said second end unit 120. The second lateral leaf spring 240 is mounted by fasteners 210 (not shown) to a second side 124 (not shown) of the second end unit 120, with prong 250 extending toward said first end unit 110.

Lastly, the first longitudinal leaf spring 160 is mounted by fasteners 210 (not shown) to the first front 116 (not shown) of the first end unit 110, with the prongs 162 and 164 facing inward towards the second side 124 of the second end unit 120, but not extending past the first lateral leaf spring 150. In addition, the lower prong 164 and the spring body 166 define a first gap through which the first vertical leaf spring 140 extends.

Similarly, the second longitudinal leaf spring 260 is mounted by fasteners 210 (not shown) to the second front 126 of the second end unit 120, with the prongs 270 and 280 facing inward towards the second side 118 (not shown) of the first end unit 110, but not extending past the second lateral leaf spring 240. In addition, the upper prong 270 and the spring body 275 defines a second gap through which the second vertical leaf spring 220 extends. Pursuant to this arrangement, both the vertical load cell 170 and the lateral load cell 190 can be positioned between the first end unit 110 and the second end unit 120.

It is understood that where more axes than that shown in FIGS. 1 and 2 are to be monitored or connected, additional load cells and opposable pairs of complimentary leaf springs will be employed. In addition, where required, prongs may be added to or removed from each opposable pair of complimentary leaf springs depending on the need.

Figure 3:
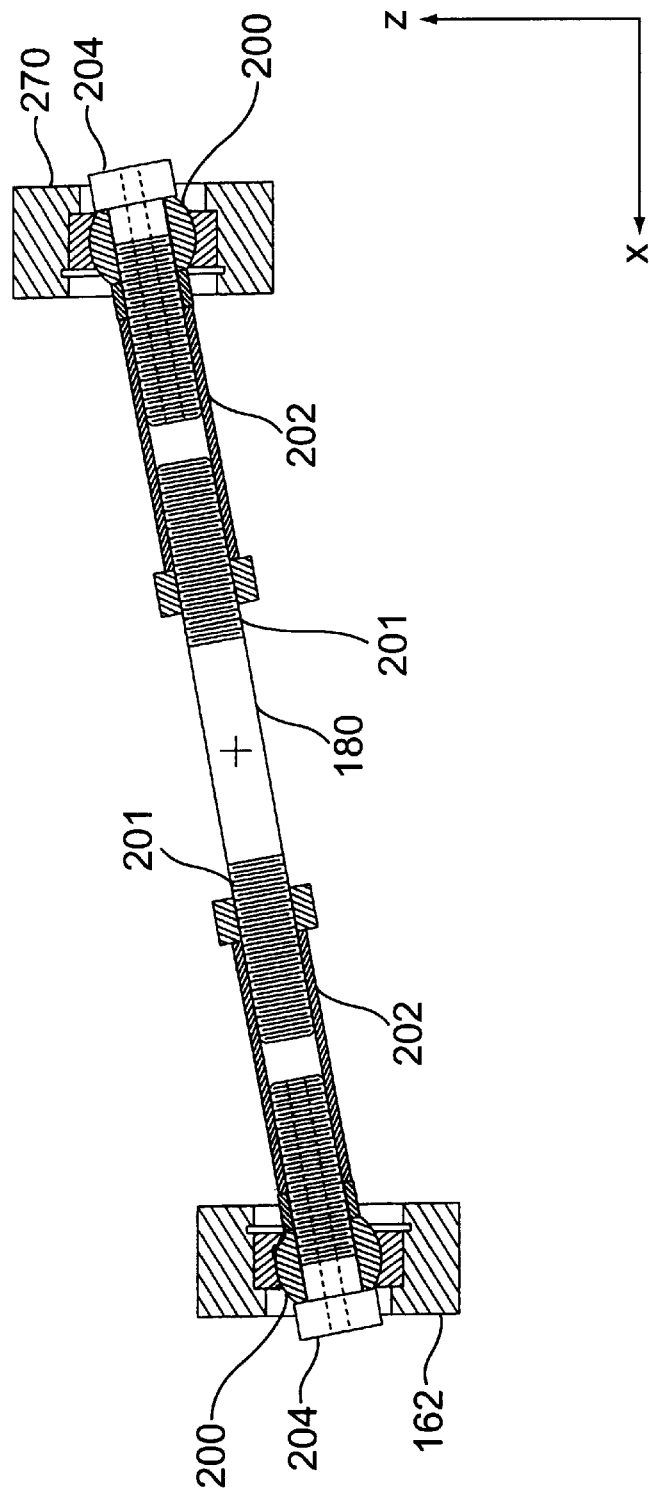
FIG. 3 is a side view showing an example of a load cell being attached to prongs through spherical bearings where that load cell is undergoing non-axial displacement according to the present invention.

An example of how spherical bearings 200 are mounted in prongs of an opposable pair of complimentary leaf springs according to a preferred embodiment is shown in FIG. 3. In FIG. 3, the longitudinal load cell 180 is connected to prongs 162 and 270 by spherical bearings 200. The spherical bearings 200 are mounted within prongs 162 and 270, with the longitudinal load cell 180 secured to the spherical bearings 200 using a combination of threads 201, coupling nuts 202, and cap screws 204.

FIG. 3 shows how such an arrangement reacts to non-axial displacements. As shown in FIG. 3, the spherical bearings 200 provide support along the common axis for the opposable leaf springs, which in FIG. 3 is the X axis. At the same time, this arrangement allows for minimal resistance to displacements perpendicular to the X axis, effectively isolating the longitudinal load cell 180 from displacements perpendicular to the X axis by allowing the load cell 180 to pivot in reaction to the non-axial load.

This mounting method is repeated for all connections between load cells and prongs as exists for the spherical bearings 200 mounted in prongs 142, 152, 162, 164, 230, 250, 270 and 280. It is recognized that a spherical bearing 200 is only one type of axial motion isolation bearing. Other bearing types, ball joints, rubber flexible connectors, universal joints, or other similar connectors may be used so long as it substantially isolates the load passing through the axis of the load cell from other non-axial loads and bending moments. It is further understood, but not shown, that other mechanisms exists to attach load cells to spherical bearings 200.

In the preferred embodiment, the load cells 170, 190, 180, 182 are commercial threaded rod load cells, which have their strain gages mounted internally. However, other load cells will work so long as the strain gages are attached to the connector, and that connector is capable of handling the desired loading. In addition, where no strain information is needed along a particular axis, simple bolts, rods, or other connectors would suffice for that connection. Thus it is recognized that where there is no need to monitor the loads in certain directions, load cells can be replaced with connectors, and additionally, where a pure connector embodiment is to be employed, no load cells will be used in the load-sensing, multi-axis connector 100.

In combination, these various parts compliment one another, as shown in FIG. 1. Essentially, the first combination of first end unit 110, first vertical leaf spring 140, first lateral leaf spring 150, and first longitudinal leaf spring 160 faces the second combination of the second end unit 110, second vertical leaf spring 140, second lateral leaf spring 150, and second longitudinal leaf spring 160, only with the second end unit rotated 180° about the X axis as defined in FIG. 1.

Figure 4A:
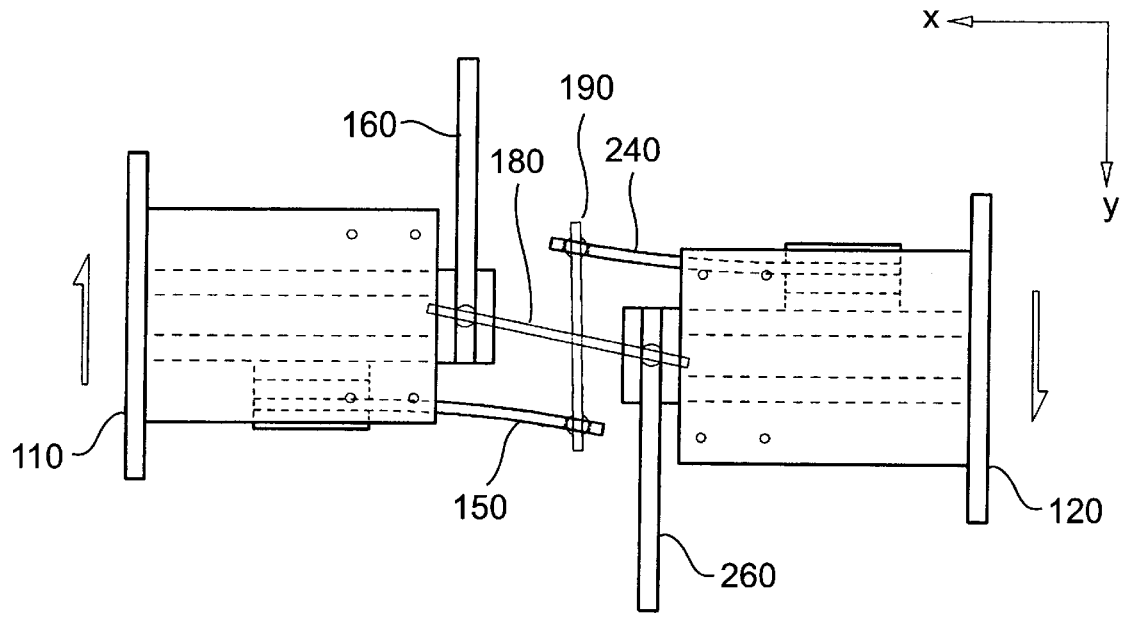
FIG. 4a is a top view of the load-sensing, multi-axis connector undergoing single axis displacement along the Y axis showing the interaction of the longitudinal and lateral leaf springs in resisting these displacements according to the present invention.
Figure 4B:
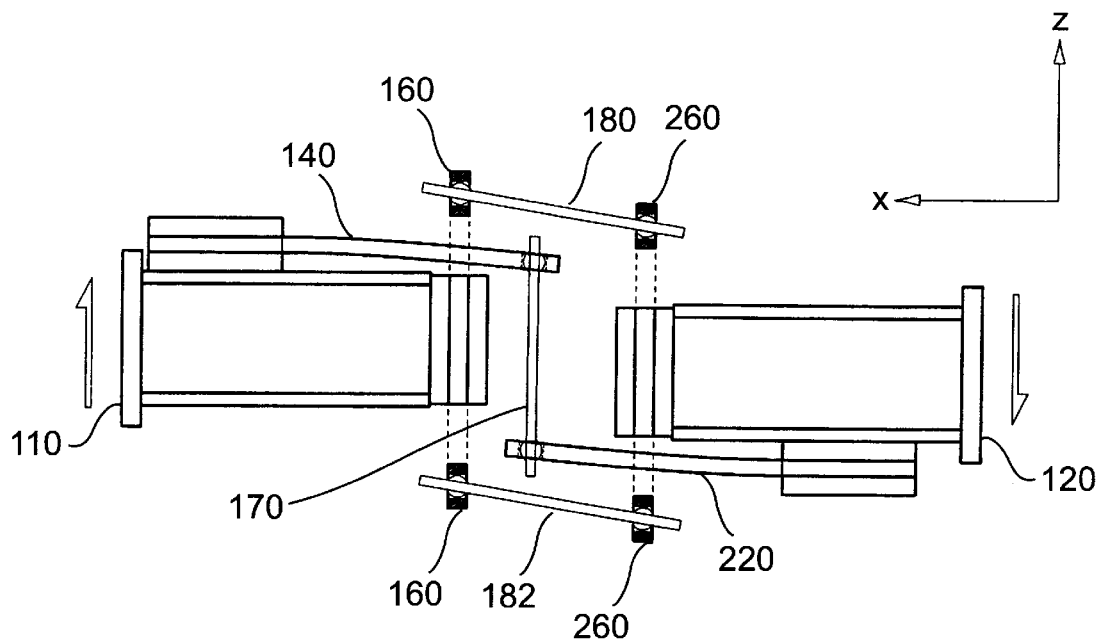
FIG. 4b is a side view of the load-sensing, multi-axis connector undergoing single axis displacement along the Z axis showing the interaction of the longitudinal and vertical leaf springs in resisting these displacements according to the present invention.
Figure 4C:
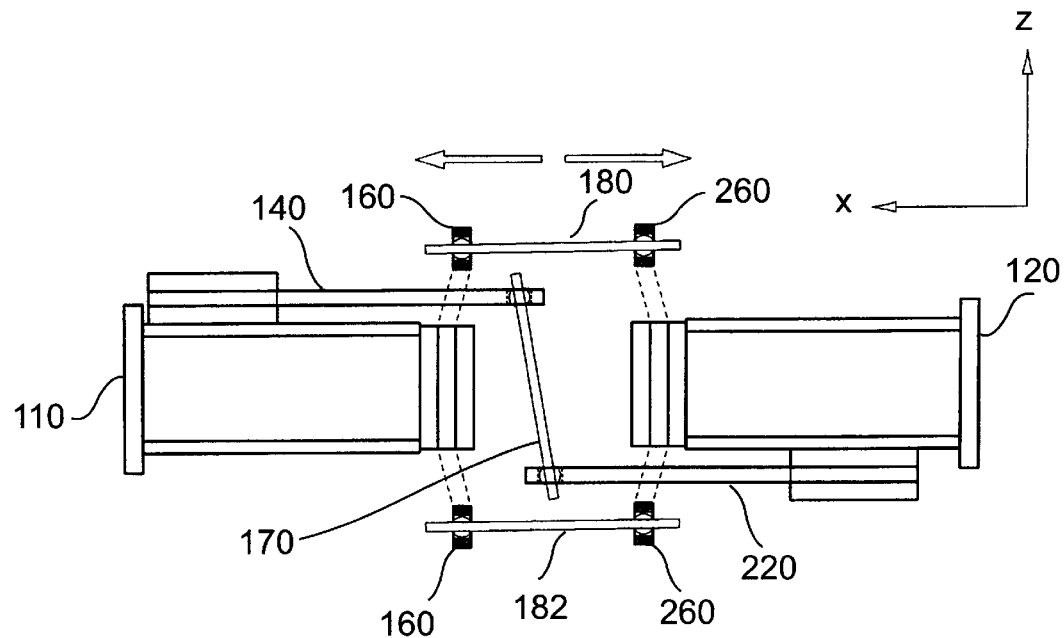
FIG. 4c is a side view of the load-sensing, multi-axis connector undergoing single axis displacement along the X axis showing the interaction of the longitudinal and vertical leaf springs in resisting these displacements according to the present invention.
Figure 4D:
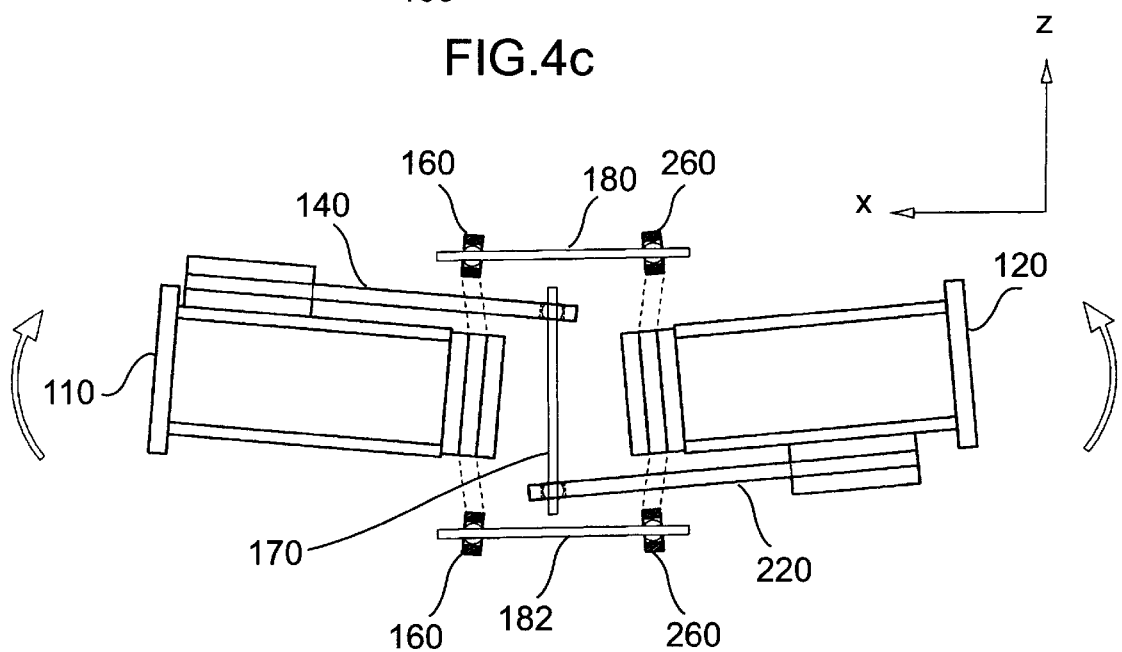
FIG. 4d is a side view of the load-sensing, multi-axis connector undergoing flexural motion about the Y axis showing the interaction of the longitudinal and vertical leaf springs in resisting these displacements according to the present invention.

As shown in schematic FIGS. 4a, 4b, 4c, and 4d, when in use, the load-sensing, multi-axis connector 100 is able to react to relative displacements along the X, Y, and Z axes, flexural motion about the X, Y, Z axes, or any combination thereof. As shown in FIG. 4a, the lateral leaf springs 150 and 240 resist displacements along the common lateral axis, the Y axis. As shown in FIG. 4b, the vertical leaf springs 140 and 220 substantially resist displacements along the common vertical axis, the Z axis. As shown in FIG. 4c, the longitudinal leaf springs 160 and 260 substantially resist all displacements along the common longitudinal axis, the X axis. In addition, FIG. 4b shows the longitudinal load cells 180 and 182, which are symmetrically arranged on the longitudinal leaf springs 160 and 260, jointly resist displacements along the longitudinal axis, the X axis.

Where the load-sensing, multi-axis connector 100 is undergoing flexural motion, a combination of the longitudinal load cells 180 and 182, lateral load cell 190, and/or the vertical load cell 170 will resist this moment. As an example, FIG. 4d shows the reaction of the load-sensing, multi-axis connector 100 where this moment is about the Y axis. As shown in FIG. 4d, the longitudinal load cells 180 and 182 in combination with the vertical load cell 170 provide resistance to this moment.

It is recognized that where multiple connectors are added or removed to an opposing pair of leaf springs, that these connectors be similarly symmetrically mounted to their complimentary leaf springs so as to balance the resistance to motion along their common axis.

The responses shown in FIGS. 4a, 4b, 4c, and 4d are those experienced in relatively low displacements, where the load cells 170, 190, 180 and 182 are remain orthogonal and provide highly decoupled response. By decouple, this means that there is little interdependence between load cells 170, 190, 180 and 182. Thus vertical load cell 170 resists the vast majority of the vertical displacement along the Z axis, the lateral load cell 190 resists the vast majority of the lateral displacement along the Y axis, and the longitudinal load cells 180 and 182 jointly resist the vast majority of the longitudinal displacement along the X axis. However, as the displacement increases, this orthogonality decreases and load cells 170, 190, 180 and 182 begin to couple, meaning that they become interdependent with each load cell resisting non-negligible amounts of displacements from each direction.

It is important to understand that by substantially resisting displacements along a particular axis, it is understood that, especially in high displacements, that all of the and load cells 170, 190, 180 and 182 will provide some resistance to all displacement. However, the vertical load cell 170 will still resist the majority of the vertical displacement along the Z axis, lateral load cell 190 will still resist the majority of the lateral displacement along the Y axis, and longitudinal load cells 180 and 182 will jointly still resist the majority of the longitudinal displacement along the X axis. Thus the load cells 170, 190, 180 and 182 substantially resist the displacement along their common axis, but still provide non-negligible to minimal resistance to non-axial displacements.

In addition, in order to interpret the load data in high displacement situations, different procedures will need to be followed to account for the coupling effect. In low displacement situations, straight readings from the load cells provide an accurate measurement of the loads experienced by the connector since the load cells 170, 190, 180 and 182 are decoupled. However, in these high displacement situations, the load components along the X, Y, and Z axis cannot be directly derived since the load cells 170, 190, 180 and 182 are coupled, but they may still be derived by utilizing an iterative decomposition procedure to derive these constituent forces and moments.

In a preferred embodiment, the end units 110 and 120 are made from 6061-T6 aluminum. In addition, the vertical leaf springs 140 and 220, the lateral leaf springs 150 and 240, and the longitudinal leaf springs 160 and 260 being made of ¾ inch thick 7075-T6 aluminum. In the preferred embodiment, this resulted in the vertical leaf springs 140 and 220 having a spring constant of 1021 lbs/in, the lateral leaf springs 150 and 240 having a spring constant of 517 lbs/in, and the longitudinal leaf springs 160 and 260 having a spring constant of 1105 lbs/in. However, it is recognized that other metals, plastics, rubber, other compliant materials may be used instead of aluminum for some or all of these parts. In addition, these spring constants may be altered by changing material, material thickness, or for existing leaf springs, attaching chocks to a leaf springs to increase its thickness.

What has been described is only one of many possible variations on the same invention and is not intended in a limiting sense. The claimed invention can be practiced using other variations not specifically described above.

What is claimed is:

1. A load-sensing, multi-axis connector comprising:
   a plurality of first leaf springs;
   a plurality of second leaf springs wherein each said second leaf spring forms an opposable pair with its complimentary said first leaf spring;
   wherein each said first leaf spring and said second leaf spring are aligned along a common axis; and
   a plurality of connectors connecting said opposable pairs wherein each said opposable pair resists displacement of said connector in the direction of said common axis;
   wherein said connectors are rotatably connected to said first leaf springs and said second leaf springs through a plurality of axial motion isolation bearings.

2. The load-sensing, multi-axis connector of claim 1 wherein at least one of said connectors is a load cell.

3. The load-sensing, multi-axis connector of claim 2 wherein all of said connectors are load cells.

4. The load-sensing, multi-axis connector of claim 3 wherein said plurality of first leaf springs further comprises a first vertical leaf spring, a first lateral leaf spring, and a first longitudinal leaf spring; wherein said plurality of second leaf springs further comprises a second vertical leaf spring, a second lateral leaf spring, and a second longitudinal leaf spring; wherein said first vertical leaf spring forms an opposable pair with said second vertical leaf spring; wherein said first lateral leaf spring forms an opposable pair with said second lateral leaf spring; and wherein said first longitudinal leaf spring forms an opposable pair with said second longitudinal leaf spring.

5. The load-sensing, multi-axis connector of claim 4 wherein said common axis of said first vertical leaf spring and said second vertical leaf springs is a common vertical axis; wherein said common axis of said first lateral leaf spring and said second lateral leaf spring is a common lateral axis; wherein said common axis of said first longitudinal leaf spring and said second longitudinal leaf spring is a common longitudinal axis; and wherein said common vertical axis, common lateral axis, and common longitudinal axis are orthogonal to one another.

6. The load-sensing, multi-axis connector of claim 5 further including a first end unit, wherein said first vertical leaf spring, said first lateral leaf spring, and said first longitudinal leaf spring are attached to said first end unit.

7. The load-sensing, multi-axis connector of claim 6 further including a second end unit, wherein said second vertical leaf spring, said second lateral leaf spring, and said second longitudinal leaf spring are attached to said second end unit.

8. The load-sensing, multi-axis connector of claim 7 wherein said plurality of axial motion isolation bearings are spherical bearings.

9. A load-sensing, multi-axis connector comprising:
a first vertical leaf spring having at least one prong;
a second vertical leaf spring having at least one prong;
wherein each said first vertical leaf spring and said second vertical leaf spring are aligned along a common vertical axis;
at least one vertical connector connecting said prongs of said first vertical leaf spring and said prongs of said second vertical leaf spring and wherein each said vertical connector is aligned along said common vertical axis;
a first lateral leaf spring having at least one prong;
a second lateral leaf spring having at least one prong;
wherein each said first lateral leaf spring and said second lateral leaf spring are aligned along a common lateral axis;
at least one lateral connector connecting said prongs of said first lateral leaf spring and said prongs of said second lateral leaf spring and wherein each said lateral connector is aligned along said common lateral axis;
a first longitudinal leaf spring having at least one prong;
a second longitudinal leaf spring having at least one prong;
wherein each said first longitudinal leaf spring and said second longitudinal leaf spring are aligned along a common longitudinal axis;
at least one longitudinal connector connecting said prongs of said first longitudinal leaf spring and said prongs of said second longitudinal leaf spring and wherein each said longitudinal connector is aligned along said common longitudinal axis;
a first end platform wherein said first vertical leaf spring, said first lateral leaf spring, and said first longitudinal leaf spring are mounted to said first platform; and
a second end platform wherein said second vertical leaf spring, said second lateral leaf spring, and said second longitudinal leaf spring are mounted to said second platform.

10. The load-sensing, multi-axis connector of claim 9 wherein said vertical connectors are symmetrically mounted between said first vertical leaf spring and said second vertical leaf spring whereby the displacement resisted by said vertical connectors is balanced between said vertical connectors along said common vertical axis.

11. The load-sensing, multi-axis connector of claim 10 wherein said lateral connectors are symmetrically mounted between said first lateral leaf spring and said second lateral leaf spring whereby the displacement resisted by said lateral connectors is balanced between said lateral connectors along said common lateral axis.

12. The load-sensing, multi-axis connector of claim 11 wherein said longitudinal connectors are symmetrically mounted between said first longitudinal leaf spring and said second longitudinal leaf spring whereby the displacement resisted by said longitudinal connectors is balanced between said longitudinal connectors along said common longitudinal axis.

13. The load-sensing, multi-axis connector of claim 12 further comprising a plurality of axial motion isolation bearings rotatably connecting said vertical connectors to said first vertical leaf spring and said second vertical leaf spring, rotatably connecting said lateral connectors to said first lateral leaf spring and said second lateral leaf spring, and rotatably connecting said longitudinal connectors to said first longitudinal leaf spring and said second longitudinal leaf spring.

14. The load-sensing, multi-axis connector of claim 13 wherein at least one of said vertical connectors, said lateral connectors, or said longitudinal connectors is a load cell.

15. The load-sensing, multi-axis connector of claim 14 wherein all of said vertical connectors, said lateral connectors, and said longitudinal connectors are load cells.

16. The load-sensing, multi-axis connector of claim 15 wherein said first end platform further comprises a bottom, a first side, and a first front; said second end platform further comprises a top, a second side, and a second front; wherein said first vertical leaf spring is attached to said bottom and said second vertical leaf spring is attached to said top; wherein said first lateral leaf spring is attached to said first side and said second lateral leaf spring is attached to said second side; wherein said first longitudinal leaf spring is attached to said first front and said second longitudinal leaf spring is attached to said second front; and wherein said first front faces said second front.

17. The load-sensing, multi-axis connector of claim 16 wherein said first vertical leaf spring and said second vertical leaf springs substantially resists all displacements along said vertical common axis, said first lateral leaf spring and said second lateral leaf spring substantially resists all displacements along said lateral common axis, and said first longitudinal leaf spring and said second longitudinal leaf spring substantially resists all displacements along said longitudinal common axis; and wherein said vertical common axis, said lateral common axis, and said longitudinal common axis are orthogonal to one another.

18. The load-sensing, multi-axis connector of claim 17 wherein said plurality of axial motion isolation bearings are spherical bearings.

19. The load-sensing, multi-axis connector of claim 18 wherein said at least one prong of said first lateral leaf spring is one prong; wherein said at least one prong of said second lateral leaf spring is one prong; wherein said at least one prong of said first vertical leaf spring is one prong; wherein said at least one prong of said second vertical leaf spring is one prong; wherein said at least one prong of said first longitudinal leaf spring is two prongs; wherein said at least one prong of said second longitudinal leaf spring is two prongs; wherein said prongs of said first longitudinal leaf spring define a first gap through which said prong of said first vertical leaf spring extends; and wherein said prongs of said second longitudinal leaf spring define a second gap through which said prong of said second vertical leaf spring extends.

* * * * *